DIVERSITY RECEPTION COMBINER EMPLOYING BEAM DEFLECTION TUBES
Filed Dec. 13, 1961
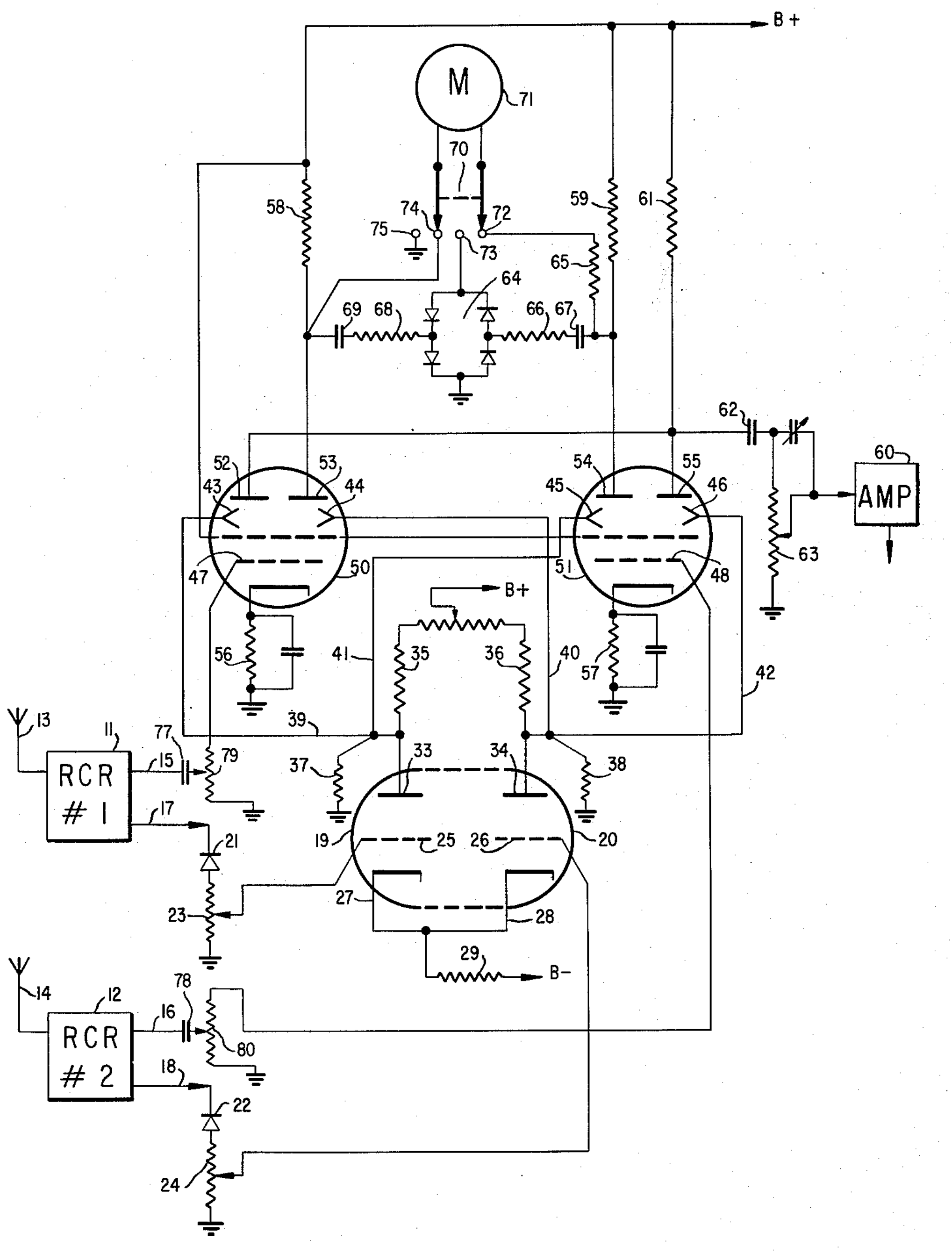
*INVENTOR.*
VICTOR A. RATNER
*BY*
*Mead, Browne, Schuyler & Beveridge*
*ATTORNEYS*

United States Patent Office 3,238,458

Patented Mar. 1, 1966

3,238,458

DIVERSITY RECEPTION COMBINER EMPLOYING BEAM DEFLECTION TUBES

Victor A. Ratner, Silver Spring, Md., assignor to Defense Electronics, Inc., Rockville, Md., a corporation of Maryland Filed Dec. 13, 1961, Ser. No. 159,037
9 Claims. (Cl. 325—305)

This invention relates to the improvement of signal/noise ratio in the reception of signals which are to be combined in a manner to subdue the noise and enhance the output signal. It relates more particularly to diversity reception by two receivers wherein the receivers are spaced apart, each receiving the same signal but with differing degrees of fading.

Considerable effort has been directed to the transmission and reception of information signals employing two or more paths of transmission, one to each of a group of antennas. A separate receiver responds to each antenna. While one receiver experiences fading of the signal received, other receivers may receive the signal without loss or with much smaller loss and the information is better received from the combination of receivers than from either alone. Such a system may employ various kinds of diversity transmission and reception. This invention, however, is explained in terms of dual reception of transmission from a single source which may be propagated by different paths naturally occurring as a result of separation of the receivers, but is useful with diversity reception, generally.

In any diversity reception it is always necessary to provide some type of combiner which adds the signals together, or selects between the signals for the development of a useful output signal. Many prior devices have combined the signal as received prior to detection or utilization. More recently it has been found desirable to receive and demodulate these radio signals, after which they are combined to form a useful output. Combiners for this purpose are referred to as post detection diversity combiners. These combiners require a control signal for the selection of which received information signal will be passed as output, or when combined, for controlling the manner of combining of the signals. For this purpose expander/compresser circuits, push/pull circuits, and cathode coupled configurations have been employed.

Such methods of combining signals do not in general produce a stable output amplitude which may be required in the utilization circuit. There is also present in the output some portion of the control signal and the output information is undesirably altered thereby. Furthermore, these circuits have been limited in their ability to respond to rapidly changing fading conditions. This problem has been of particular importance in telemetering applications, and particularly in the monitoring of the behavior of missiles in flight. Such service generally requires receiver response to extremely wide variations of signal strength and to a wide variety of frequencies.

A note in the Proceedings of IRE for November 1954, entitled "Ratio Squarer," by Mr. L. R. Kahn, sets forth mathematical reasoning to show that the optimum enhancement of the signal-to-noise ratio in diversity reception is best achieved by squaring the ratio of signal-to-noise in the respective receivers after detection prior to their summation to develop the combined output. One apparatus for the purpose is shown. Such efforts to achieve ratio squared summation of signals usually have involved a considerable amount of equipment and circuitry and have suffered from the beforementioned defects, especially with regard to inability to respond to high fading rates and the difficulties encountered because of the inclusion in the output of a control signal developed for the purpose of producing the ratio squared function. In such circuitry it has generally not been practicable to produce a constant amplitude of output during the time of the fading of one or another of the signals before they are combined in the combiner.

It is an object of the present invention to provide a new method and apparatus for combining in an optimum way signals after detection in diversity receivers.

Another object of the invention is to provide an improved method and means for combining signals after detection according to the squares of the signal-to-noise ratios and to present an output of constant amplitude.

A further object of the invention is to provide circuitry for combining diversity reception signals after detection in an extremely rapid manner, each signal being weighted according to the squares of the respective signal-to-noise ratios.

A further object of the invention is to provide improved control means within a diversity reception combiner for better observation and control of the combining operation.

In order to achieve these objects there are provided a pair of receivers tuned to the desired signal, each producing a video output and an AGC signal, the latter being used to control the combining ratio for the video signals in accordance with a differential voltage therefrom applied to the deflection plates in parallel of two beam deflection tubes. The output is taken from opposite plates of the tubes via a common load impedance, and is independent of the relative signal strengths.

Still other objects and advantages of the invention will become apparent as the description proceeds in connection with the drawing in which FIG. 1 shows by a schematic wiring diagram the combiner of this invention.

A receiving station may include first and second receivers 11 and 12, usually of FM type, connected to respective antennas 13 and 14, each having a detected (video) signal output shown at 15 and 16. These receivers conventionally include automatic gain control circuitry (not shown) which provides an automatic gain control voltage (hereinafter referred to as AGC), which is essential to prevent extreme variations in output signal strength. Receivers 11 and 12 have outputs at 17 and 18, respectively, which outputs are taken from the AGC voltages in the receivers. Such AGC voltages have generally been analyzed as being essentially logarithmic representation of the radio frequency input level. It is also a logarithmic function of the signal-to-noise ratio. Such an AGC output, however, is not suitable for directly controlling the combining ratio for the video signals at 15 and 16 which require a linear function.

A differential amplifier comprising a pair of amplifying devices 19 and 20, here illustrated as triode tubes, compares the AGC outputs and develops therefrom a differential output of the desired linear form. It is to be understood that transistor circuitry might be employed in lieu of triode tubes. As illustrated triodes 19 and 20 are supplied with control voltages each of negative sign and of magnitude dependent upon the signal input to the receivers 11 and 12, an arrangement achieved, for example, by connecting outputs 17 and 18 through diodes 21 and 22 to ground by way of potentiometers 23 and 24, respectively, the diodes being poled so as to permit the development across potentiometers 23 and 24 of negative voltages, each dependent upon the AGC voltage developed at the receiver. Potentiometers 23 and 24 serve also as variable attenuators having taps which connect an adjusted portion of the voltage so developed thereon to grid elements 25 and 26, respectively, in the triodes 19 and 20. Cathodes 27 and 28 of the differential amplifier device are connected together in a conventional common cathode arrangement wherein a common cathode resistor 29 is connected to the negative terminal of a suitable D.C. power supply. Triodes 19 and 20 have anode elements 33 and 34 supplied through load resistors 35 and 36, respectively, with voltage from a positive D.C. supply preferably by way of a balancing potentiometer as indicated.

The voltage output from the differential amplifier is taken from the junction of the anode supply resistor 35 with the corresponding anode 33 on the one side and from the junction of the anode supply resistor 36 and the anode 34 on the other side. Between these junctions there is developed a voltage which is the amplified difference in the control voltages at the elements 25 and 26. In order that the output of the differential amplifier shall be at suitable potential level there are connected to the aforementioned junctions resistor 37 on the one side and 38 on the other side of the differential output, each connected to ground at the opposite end thereof. By way of example resistors 35 and 37 might be alike, and resistors 36 and 38 might also be alike, the components for the amplifiers 19 and 20 being alike throughout in order to achieve equal response to control voltages from receivers 11 and 12.

This arrangement provides a substantially linear voltage representative of the difference in signal levels received which is taken by way of leads 39 and 41 from anode 33 and by way of 40 and 42 from anode 34 as the combining control function for this combiner, applied to the combining tube deflection plates.

The plates of the beam deflection tubes will be seen to have like average potentials because of the common voltage supply, the common cathode resistor and like plate resistors 35 and 36. The difference in signal at grids 25 and 26 results in departures of anode potential from this mean of essentially equal and opposite magnitude from this mean.

Since it is the purpose of this invention to combine the signals at 15 and 16 in accordance with the ratio squared of the signal-to-noise ratio in the respective receivers, a combining device is required which can respond to such a relationship so as to produce the sum of the squares of these ratios. The combiner of this invention makes use of some of the properties of tubes such as type 7360 or the type 6AR8. In each of these tubes, a pair of anodes are arranged to receive the entire electron stream coming from the cathode when the tube is conducting, and to divide the electron stream equally when the voltage between the two plates is zero and no deflecting field exists.

A pair of such beam deflection tubes is illustrated at 50 and 51 having anodes 52 and 53 in one case and 54 and 55 in the other case. Tube 50 has a left hand deflecting plate 43 connected to anode 33 as by lead 39 and tube 51 has a left hand deflecting plate 45 connected by lead 41 to anode 33. Each tube has a similar right hand deflecting plate connected to anode 34 as by lead 40 to plate 44 of tube 50 and by lead 42 to plate 46 of tube 51. Plates 43 and 44 are similar and symmetrically arranged with respect to anodes 52 and 53 and plates 45 and 46 are also like elements symmetrically disposed with respect to anodes 54 and 55. Each beam deflection tube is preferably supplied with a conventional screen grid and has a control grid 47 for tube 50 and 48 for tube 51 connected, respectively, to leads 15 and 16 which are the receiver video outputs. The cathode elements of the tubes 50 and 51 are conventional and are preferably connected to ground by like biasing resistors 56 and 57, each bypassed in conventional fashion to prevent degeneration within the tube.

Tubes 50 and 51 have one pair of anodes 53 and 54 connected separately by way of load resistors 58 and 59 to a positive supply in a manner to produce similar voltages on the anodes 53 and 54. Anodes 52 and 55 are connected to a positive voltage supply by way of load resistor 61 which completes a common connection for both anodes 52 and 55. It is noted that a higher voltage may be required for the D.C. energization of the latter anodes because of the common load resistor employed, or like resistors 58 and 59 might be made of higher value such as double the resistance of 61, to keep all anode potentials alike. Regardless of the voltage arrangement employed, similarly disposed anodes 52 and 54 are designed to receive one-half of the anode current of the respective tubes when no deflection voltage is supplied across the deflection plates of that tube. Likewise anodes 53 and 55 are designed to receive equal currents, each equal to the current to the other anode of the same tube when no deflection voltage is supplied.

A pair of deflection tubes having the characteristics above-mentioned and connected as stated are adapted to produce a combined current output from anodes 52 and 55 to load 61 which remains constant for any value of cathode current passing through the respective cathode resistors 56 and 57, even though the share of such cathode current taken by anode 52 or 53 of tube 50, or anodes 54 or 55 of tube 51, is changed by the applied deflection voltages. Because of the symmetry it will be seen that a combined output from tubes 50 and 51 could be taken either from anodes 53 and 54 if joined to a common load resistor, or from anodes 52 and 55 as herein illustrated. The combined output from anodes 52 and 55 is taken by way of the coupling capacitor 62 and a compensated adjustable attenuator 63 for application to a suitable amplifying device 60 and thence to any desired utilization circuit.

It will be evident that a steady current exists through the load resistor 61 derived one-half from each tube when no deflection voltage is applied to the beam deflecting plates. It is also evident that when similar voltages are applied across the space between plates 43 and 44 and across the space between plates 45 and 46 that the electron beam passing through the tube will be deflected in accordance with the direction of the field applied, to divide unequally between the pairs of anodes of each tube, but differing by the same amount in each tube. Any increase in current in anode 52 is accompanied by an equal decrease in current in anode 55, thereby to produce a constant output regardless of the ratio of current division between the respective anodes. Thus, anodes 53 and 54 have no part in the output to 63, but receive the residual of the current not taken by the combining anodes. These anodes are accordingly available for use as a control circuit as will be later explained.

Receivers 11 and 12 may be of any type desired for diversity reception, but are here illustrated in their connection to the beam deflecting tubes as receivers basically of frequency modulation type. Regardless of the type receiver employed it will be understood that the output video signal at 15 and 16 will be an A.C. signal of essentially constant amplitude since the receiver is of FM type employing, for example, a grid leak amplifier as a limiter prior to detection of the video output, according to well known techniques.

It will also be understood that the noise contained in the video signal varies as an inverse function of the received signal strength for the reason that the AGC circuit operates to limit the video output signal to a design maximum. The noise component is subdued by increasing degrees as the signal strength increases, such that the overall amplification of the receiver is proportionally reduced.

In a combiner according to this invention one pair of oppositely disposed anodes in the combining tubes, such as 53 and 54, is not employed in the output. These anodes nevertheless respond to the signal ratio individually and therefore may be employed to monitor the conditions in the pair of deflection tubes used in the combiner. The anode connections of resistors 58 and 59 are taken, respectively, to opposite ends of a meter circuit. For this purpose resistors 66 and 68 are connected to the anodes 53 and 54 by way of D.C. blocking capacitors 67 and 69. As illustrated, the meter circuit may be connected to anodes 53 and 54 through a rectifier bridge 64 arranged in opposed pairs of diodes to present meter input variable about zero difference in either direction according to relative anode signals. The junctions of the paired diodes are connected to anodes 53 and 54, respectively, via resistors 68 and 66, while the remaining bridge terminals are connected to ground and to the meter.

By means of current limiting resistor 65 one anode is connected to one meter terminal and the other meter terminal has a connection to the other anode, to form a deflection tube balance indicator. A switch 70 makes connection from meter 71 by way of contacts 72 and 74 or 73 and 75 to one or the other of these monitoring circuits, being shown in the former connection. Switch 70 is placed in the opposite position to connect the bridge rectifier 64 at one end to meter 71 and to ground at the other end, to indicate the squared ratio of currents from the respective receivers employed additively in load 61 to produce the combined output delivered by way of coupling capacitor 62.

The video output from receivers 11 and 12 may be appropriately coupled as by capacitors 77 and 78 to grids 47 and 48 by way of variable attenuators 79 and 80, which serve also to provide suitable negative bias for the grids, being connected to ground in a conventional manner, for example, via biasing diodes when grid current is to be avoided.

While the invention has been described with respect to a preferred embodiment, it will be apparent that other equivalent arrangements may readily be devised and it is not intended that the scope of the invention be limited to disclosed embodiments but shall include the equivalents.

What is claimed is:

1. A post detection diversity reception combiner comprising;

means receiving plural signals from a source,
said means having first and second video signal outputs and first and second control signal outputs dependent upon the strength of said received signals, respectively;
means developing a pair of oppositely varying deflection voltages under control of said control signal outputs;
a pair of beam deflection electron discharge devices parallel-energized from a power supply,
each said device having at least a cathode and a control element,
a pair of similar left and right disposed anode elements, and
a pair of similar left and right deflection plates symmetrically disposed with respect to said anodes;
means applying said video signal outputs respectivly to said control elements;
means applying said deflection voltages each in like polarity to said left and right deflection plates of said devices, respectively; and
means connecting said left anode of one to said right anode of the other said device through a common load impedance for summing the signals on said connected anodes as the combined signal output.

2. A post detection diversity combiner comprising;

a pair of beam deflection electron discharge devices including grid and cathode elements,
each said device having a pair of symmetrically disposed left and right anodes and left and right deflection plates disposed to divide an electron current between the anodes thereof in accordance with the difference of voltage on said plates thereof, respectively;
means receiving and applying to said grids, respectively, a pair of video signals of like magnitude for control of output video signal in said devices;
means receiving and applying a voltage derived from the difference in received signal level as a said difference of voltage on said deflection plates in both said devices;
and means developing a combined anode output for said devices taken from said left anode of one device and said right anode of the other device; whereby said output is the sum of the amplified signal portions reaching last said anodes according to said difference of voltage.

3. A post detection diversity receiver combiner comprising;

first and second electron discharge devices energized through a common load element,
each said device having a cathode and a grid element controlling signal therein,
a pair of anode elements arranged to receive normally equal electron currents from said cathode thereof, and
each said device further having electron beam deflecting means for altering the share of said current to said anodes thereof;
means developing a control voltage on said deflecting means in accordance with relative signal strengths of two signal sources;
means applying a signal to each of said grid elements corresponding to said differing sources of detected signal; and
means adding an increased said share of current in one said device to a decreased said share of current in the other said device to produce a combined steady output varying in the fraction from each said device according to said control voltage.

4. A diversity signal combiner comprising, means receiving two signals from the same source and producing therefrom a pair of video signals and a pair of automatic gain control signals,
means developing from said gain control signals a differential voltage representative of the difference therebetween,
a pair of beam deflection tubes energized and biased to conduct like currents under control of said video signals, respectively,
a pair of left and right anode elements in each said tube arranged and energized to normally receive like portions of said current,
a pair of left and right beam deflecting elements in each said tube arranged to vary the fraction of current to each said anode therein according a voltage between said deflecting elements,
means applying said differential voltage in like polarity to said left deflecting elements and to said right deflecting elements to similarly vary the currents to respective said anodes of each tube,
a common load element connecting a left and right one of said anodes, one in each tube, to an energizing source,
thereby to add in said element an output signal.

5. The combiner of claim 4 further including, means indicating the instantaneous ratio of currents in said anodes.

6. A diversity signal combiner for a pair of receivers each having a video and an automatic gain control signal output, comprising;

means developing a control voltage which is a function of the instantaneous difference between said gain control signals;
a pair of beam deflection tubes each comprising,
a cathode circuit including cathode biasing means,
a pair of left and right anodes arranged to normally share equally the cathode current of the tube,
a grid variably biased to respond linearly to signal thereon, and
a pair of deflecting electrodes disposed symmetrically as to said anodes to vary said share of current to each anode in response to potential differences applied to said electrodes;

means applying said control voltage in like polarity to said pair of electrodes of each tube;

means connecting a pair of left and right said anodes, one from each said tube, as a combined output; and means energizing the remaining pair of anodes to receive substantially half of the combined cathode current irrespective of said control voltage.

7. The combiner of claim 6 including, meter means for selectively indicating either the balance of mean currents in said pairs of anodes or the combining ratio of currents in said combined output.

8. A diversity combiner for received signals at two receivers including means developing an averaged signal proportional to momentary signal strength in each said receiver, a pair of beam deflection tubes energized from a D.C. source having grid, cathode, paired beam deflection plates and paired anodes therein, respectively, means feeding said received signals to said grids, respectively, means applying said averaged signal in one said receiver to like corresponding first plates of each said tube and said averaged signal in the other said receiver to second said plates of said tubes, and means developing a constant level output voltage responsive to varying proportions of signal from said one receiver, said voltage being derived from cathode currents at a pair of said anodes selected one from each tube and one being a said like corresponding plate and the other being a said other plate.

9. A diversity combiner for received signals at two receivers including means developing an averaged signal proportional to momentary signal strength in each said receiver, a pair of beam deflection tubes energized from a D.C. source having grid, cathode, paired beam deflection plates and paired anodes therein, respectively, means feeding said received signal to said grids, respectively, means applying said averaged signal in one said receiver to like corresponding first plates of each said tube and said averaged signal in the other said receiver to second said plates of said tubes, and load impedance means between said D.C. source and a pair of said anodes selected one from each tube to include a said first and second anode, whereby instantly increased current to one selected anode adds to simultaneously decrease current to the other selected anode to provide constant combined output current in said impedance element.

References Cited by the Examiner

UNITED STATES PATENTS

| | | | |
|---|---|---|---|
| 2,488,193 | 11/1949 | Hughes | 325—306 |
| 2,725,467 | 11/1955 | Atwood | 325—304 |
| 2,903,576 | 9/1959 | Altman | 325—305 |
| 2,988,703 | 6/1961 | Sensenig | 328—229 |
| 3,031,569 | 4/1962 | Mandel | 325—305 |

DAVID G. REDINBAUGH, *Primary Examiner.*

E. MULCAHY, B. V. SAFOUREK, *Assistant Examiners.*